United States Patent [19]
Dymond

[11] Patent Number: 5,452,642
[45] Date of Patent: Sep. 26, 1995

[54] POWER STEERING SYSTEM WITH SPEED RESPONSIVE FORCE TRANSMITTING CONTROL

[75] Inventor: Richard W. Dymond, Rochester Hills, Mich.

[73] Assignee: TRW Inc., Lyndhurst, Ohio

[21] Appl. No.: 190,274

[22] Filed: Feb. 2, 1994

[51] Int. Cl.[6] .............................. F15B 9/10; F15B 13/16; B62D 5/06
[52] U.S. Cl. ........................... 91/375 R; 91/386; 180/143
[58] Field of Search .................................. 91/375 R, 386; 180/141, 143

[56] References Cited

U.S. PATENT DOCUMENTS

| | | | |
|---|---|---|---|
| 4,601,358 | 7/1986 | Kozuka et al. | 91/375 A X |
| 4,633,963 | 1/1987 | Hasegawa | 180/143 |
| 4,793,433 | 12/1988 | Emori et al. | 91/375 A X |
| 4,805,714 | 2/1989 | Nakamura et al. | 91/375 A X |
| 4,811,806 | 3/1989 | Lang . | |
| 4,819,545 | 4/1989 | Dymond | 91/375 A X |
| 4,906,784 | 3/1990 | Yamashita | 91/375 A X |
| 5,046,574 | 9/1991 | Goodrich, Jr. et al. . | |
| 5,070,957 | 12/1991 | Harkrader et al. | 180/141 |
| 5,070,958 | 12/1991 | Goodrich, Jr. et al. . | |
| 5,135,068 | 8/1992 | Emori et al. . | |
| 5,158,149 | 10/1992 | Emori | 180/143 |
| 5,190,119 | 3/1993 | Nomura et al. | 91/375 A X |
| 5,207,780 | 5/1993 | Norimatsu et al. | 180/141 |
| 5,293,954 | 3/1994 | Dymond | 180/143 X |
| 5,297,647 | 3/1994 | Duffy | 180/143 |
| 5,339,917 | 8/1994 | Eberhart | 180/143 |
| 5,392,875 | 2/1995 | Duffy | 91/375 A X |

Primary Examiner—John E. Ryznic
Attorney, Agent, or Firm—Tarolli, Sundheim & Covell

[57] ABSTRACT

A power steering control valve including relatively rotatable inner and outer valve members. A power steering resistance control system resists relative rotation between the inner and outer valve members with a force which varies as a function of variations in vehicle speed and steering demand. The power steering resistance control system includes a force transmitting member which is disposed adjacent to one end of the outer valve member. A spring force is applied against the force transmitting member urging it in a first direction along the axis of rotation of the valve members. Fluid pressure is applied against the force transmitting member to urge it in the first direction. A valve is operable to vary the fluid pressure applied against the force transmitting member. A solenoid valve controls the position of the valve as a function of vehicle speed and steering demand.

21 Claims, 3 Drawing Sheets

POWER STEERING SYSTEM WITH SPEED RESPONSIVE FORCE TRANSMITTING CONTROL

BACKGROUND OF THE INVENTION

The present invention relates to a vehicle power steering system, and more specifically to a hydraulic vehicle power steering system in which the resistance to actuation of a power steering control valve increases with increasing vehicle speed and steering demand.

A known rotary power steering control valve shown in U.S. Pat. No. 5,046,574 has an inner valve member which is coaxial with and rotatable relative to an outer valve member or sleeve. To effect actuation of the power steering motor to turn steerable vehicle wheels, the inner valve member is rotated relative to the outer valve member. A fluid pressure reaction chamber is provided to regulate the torque required to rotate the inner valve member relative to the outer valve member. The fluid pressure in the reaction chamber increases as vehicle speed increases to increase the resistance felt by an operator of the vehicle to rotation of the inner valve member relative to the outer valve member.

SUMMARY OF THE INVENTION

The present invention provides a new and improved apparatus for controlling the operation of a hydraulic power steering motor of a vehicle. The apparatus includes a manually actuated hydraulic, rotary, directional control valve having inner and outer relatively rotatable valve members. The relative rotation of the valve members provides flow and pressure control of the hydraulic fluid from the pump to the steering motor and its return to reservoir.

A speed responsive control unit is connected in fluid communication with the control valve by a conduit through which hydraulic fluid from the control valve is returned to a reservoir. The speed responsive control unit is programmed to increasingly restrict fluid flow to the reservoir as vehicle speed increases and steering demand increases to increase the pressure in a fluid pressure chamber that regulates the torque required to displace the inner valve member relative to the outer valve member.

As the pressure in the fluid pressure chamber increases, the resistance to relative rotation between the inner and outer valve members is increased and to the vehicle operator the steering feels more manual while still having power assisted steering. In neutral, the control valve is in an open center condition and hydraulic fluid is circulated at low pressure from the pump to the reservoir. Thus, the power steering pump does not have to act against high pressure when there is no steering and energy can be saved.

A force transmitting member rotatable with the inner valve member is pressed toward the outer valve member by a biasing spring with a small spring constant and the fluid pressure in the fluid pressure chamber. The force transmitting member provides resistance to relative rotation between the inner and outer valve members that increases as pressure in the fluid pressure chamber increases. The speed responsive control unit includes an orifice that varies the pressure in the fluid pressure chamber. A speed responsive valve controls the size of the orifice as a function of steering demand and vehicle speed. The orifice is maintained open to vent the fluid pressure chamber to reservoir pressure when there is no steering demand or when the vehicle speed is low. The orifice is restricted or closed in response to increasing hydraulic fluid pressure due to a steering demand and increasing vehicle speed. Thus, the pump does not have to pump against an increasing pressure in the fluid pressure chamber as vehicle speed increases when there is no steering demand.

BRIEF DESCRIPTION OF THE DRAWING

The foregoing and other features of the present invention will become apparent to one skilled in the art upon reading the following description with reference to the accompanying drawings wherein.

DESCRIPTION OF THE PREFERRED EMBODIMENT

Figure 1A:
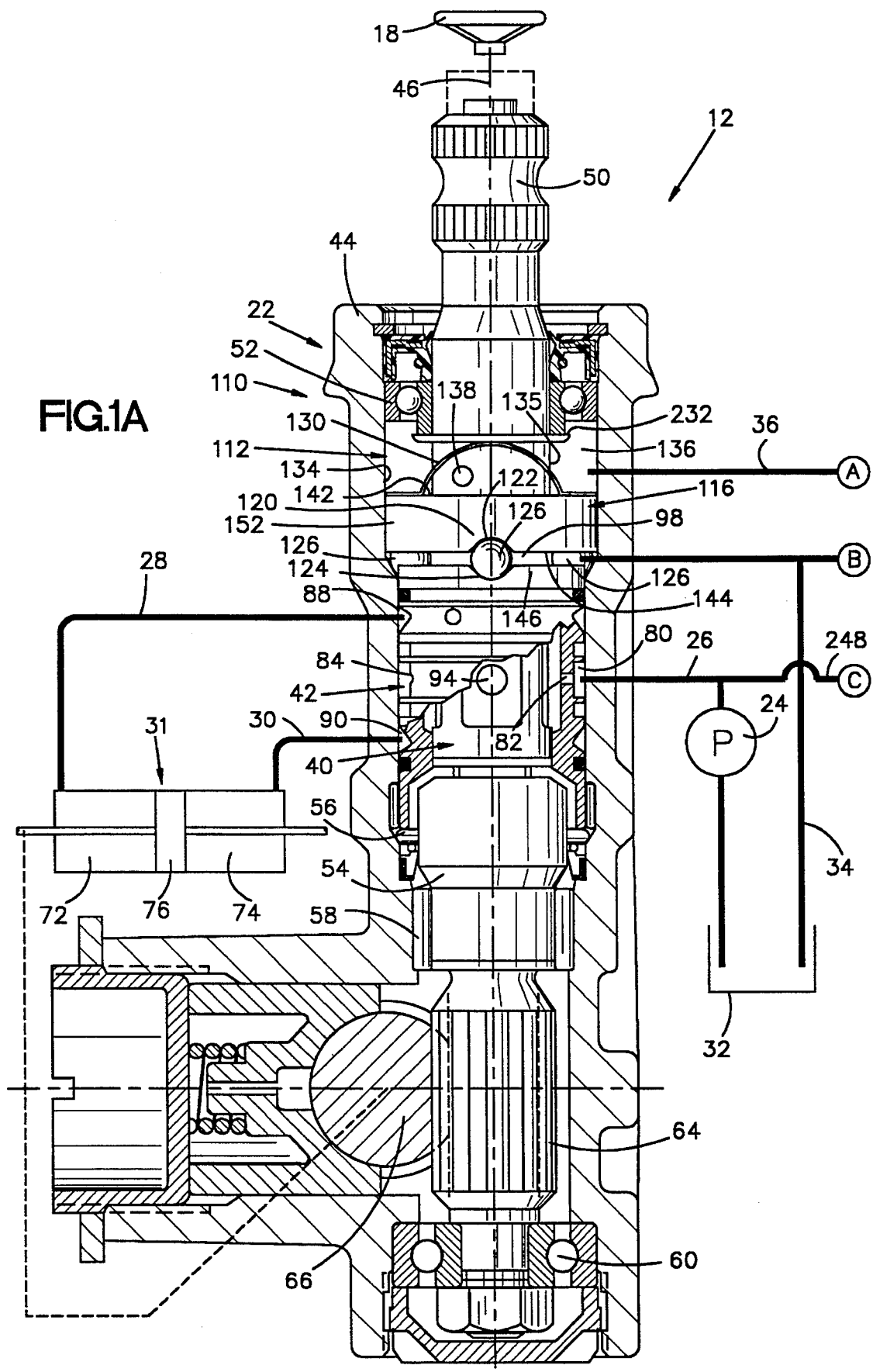
FIG. 1A is a schematic view of a portion of a vehicle power steering system and includes an enlarged sectional view of a power steering control valve.

In the present invention, a vehicle power steering system 12 (FIG. 1A) is operable to turn steerable vehicle wheels (not shown) upon rotation of a steering wheel 18 by an operator of the vehicle. Rotation of the steering wheel 18 actuates a hydraulic power steering directional control valve 22 to port hydraulic fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels in one or another direction. Simultaneously, fluid is conducted from the motor 31 to a reservoir 32 through the other one of the motor conduits 28 or 30, the control valve 22, return conduits 34 and 36, and a speed responsive control unit 38 (FIG. 1B).

Figure 1B:
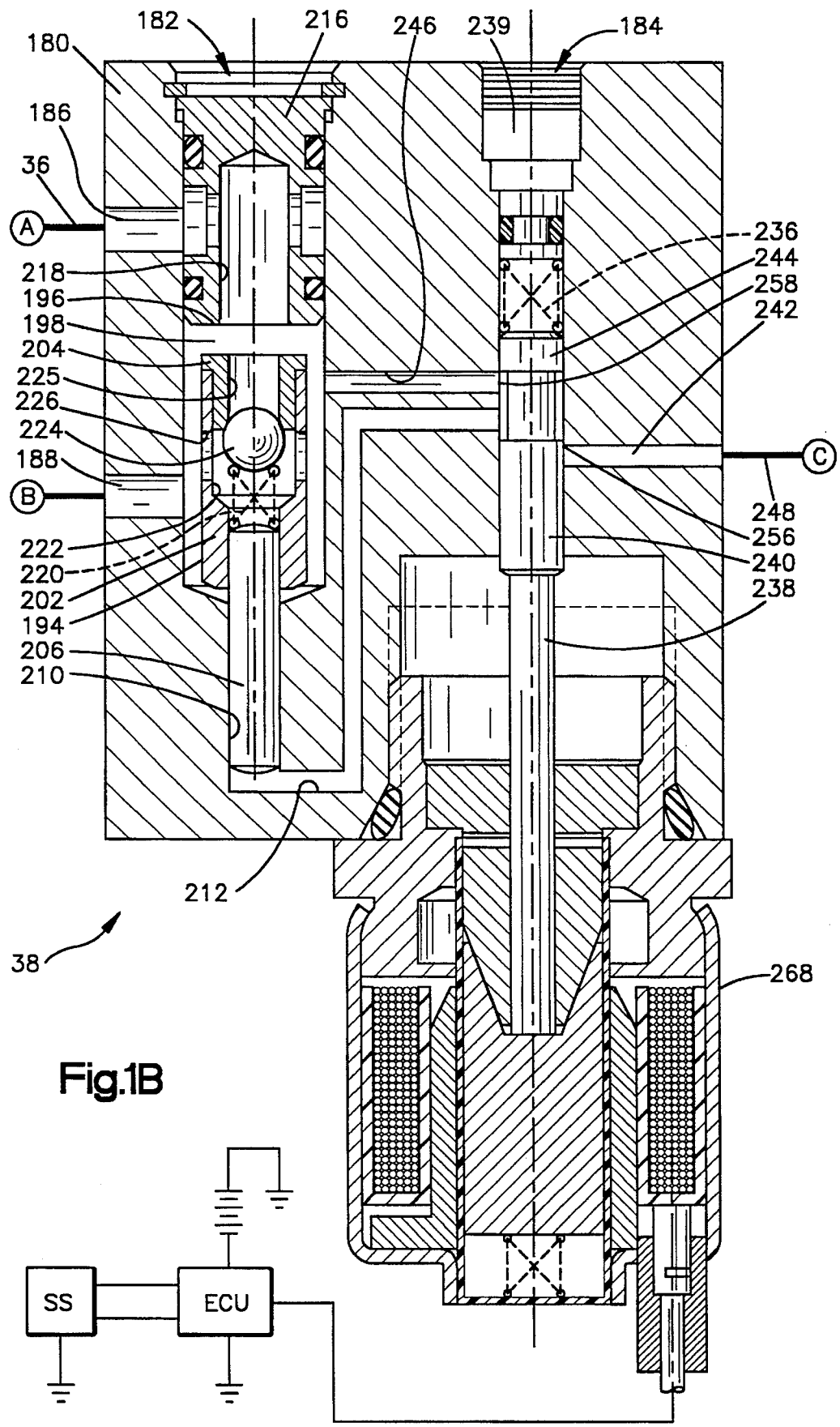
FIG. 1B is an enlarged sectional view of a speed responsive control unit forming another portion of the vehicle power steering system of FIG. 1A.

The points marked A, B and C in FIG. 1A correspond to the points marked A, B and C in FIG. 1B. Thus, return conduit 36 conducts fluid from the steering valve 22 to the speed responsive control unit 38. Return conduit 34 conducts fluid from the steering valve 22 and the speed responsive control unit 38 to the reservoir 32. Conduit 248 conducts fluid from the pump 24 to the speed responsive control unit 38 and will be described in detail hereinafter.

The control valve 22 (FIG. 1A) includes an inner rotary valve member 40 and an outer rotary valve member or sleeve 42. The outer valve member 42 encloses the inner valve member 40. The inner valve member 40 and outer valve member 42 are rotatable relative to (a) each other and (b) a housing 44 about a common central axis 46.

The inner valve member 40 is formed on a part of a cylindrical input member or valve stem 50 which is connected with the steering wheel 18. Bearings 52 support the inner valve member 40 and the valve stem 50 for rotation relative to the housing 44. The bearings 52 also maintain the axial position of the inner valve member 40 relative to the outer valve member 42. There is no torsion bar interconnecting the inner and outer valve members 40 and 42.

The outer valve member 42 is connected with a follow-up member 54 by a pin 56. The follow-up member 54 is rotatably supported in the housing 44 by bearings 58 and 60. The follow-up member 54 has a pinion gear portion 64 which is in meshing engagement with the toothed portion of a rack 66. The rack 66 is drivingly connected with the power steering motor 31 and steerable vehicle wheels as is well known in the art.

The outer valve member 42 is fixed against rotation relative to the follow-up member 54 by pin 56. The input member 50 and the inner valve member 40 can be rotated slightly with respect to the follow-up member 54 and the outer valve member 42. This relative rotation between the inner valve member 40 and the outer valve member 42 is used to control the flow of hydraulic fluid from the pump 24 to the steering motor 31.

The pump 24 is a fixed positive displacement pump. The control valve 22 (FIG. 1A) is of the open-center type. Therefore, when the control valve 22 is in an initial or unactuated neutral condition, that is when there is no steering demand, fluid flow from the pump 24 is directed by the control valve 22 to the return conduits 34 and 36 and reservoir 32. Hence, fluid is circulated at low pressure, by the pump 24 through the valve 22 and back to the reservoir 32.

Upon rotation of the steering wheel 18 and rotation of the valve stem 50, the inner valve member 40, if there is sufficient resistance to displacement of the rack 66 caused by frictional engagement of the vehicle tires with the ground or road surface, will be rotated about the axis 46 relative to the outer valve member 42. This relative rotation moves valving edges on the inner valve member 40 relative to valving edges on the sleeve 42, creates, in a known manner, a demand for higher pressure fluid from the pump 24, and directs the higher pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the flow area communicating the motor conduit 28 with the reservoir 32 and increase the flow area communicating the motor conduit 28 with the pump 24. The relative rotation between the inner valve member 40 and outer valve member 42 also increases the flow area communicating the motor conduit 30 with the reservoir 32 and reduces the flow area communicating the motor conduit 30 with the pump 24. The result is higher pressure fluid generated by the pump 24 which is conducted to the motor cylinder chamber 72. This higher pressure fluid will move the piston 76 toward the right, as viewed in FIG. 1A. As the piston 76 moves toward the right, fluid is forced from the chamber 74 through the motor conduit 30, the control valve 22, the return conduits 34 and 36, and the speed responsive control unit 38 to the reservoir 32.

As the power steering motor 31 operates, the rack 66, which is also the rod for the motor 31, rotates the pinion 64 and follow-up member 54. This rotation of the follow-up member 54 rotates the outer valve member 42 relative to the inner valve member 40 tending to return the valve 22 to its open center, neutral position. When the motor 31 is operated to turn the steerable vehicle wheels to an extent corresponding to the extent of rotation of the inner valve member 40, the feedback of the rotation of the follow-up member 54, caused by movement of the rack 66, rotates the pinion 64 through a distance sufficient to move the outer valve member 42 to its initial position relative to the inner valve member. When this occurs, the fluid pressure in the motor cylinder chambers 72 and 74 falls and equalizes and the motor 31 stops operating.

Pressurized fluid from the pump 24 is conducted to an annular central groove 80 formed in the outer valve member 42. Fluid flows to the inside of the outer valve member 42 through a pair of diametrically opposite passages 82 and 84. The inner and outer valve members 40 and 42 may have the same construction and cooperate with each other in the same manner as described in U.S. Pat. No. 4,276,812 issued Jul. 7, 1981 and entitled "Power Steering Valve and Method of Making Same". However, the inner and outer valve members 40 and 42 could have a different construction if desired.

The control valve 22 may be a "four land" type valve. The inner valve member 40 has a generally square cross-sectional configuration with rounded corners which form the four valving lands that cooperate with the edges of four axially extending grooves formed inside the outer valve member 42 to control the flow of fluid to and from the motor 31. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

In accordance with the present invention, the torque required to actuate the control valve 22 increases as steering demand and vehicle speed increase. At relatively low vehicle speeds or no steering demand, relative rotation of the inner and outer valve members 40 and 42 requires a relatively small torque to actuate the hydraulic assist motor 31 making the steering feel less manual. At higher vehicle speeds and high steering demand, the control unit 38 causes fluid pressure to act on a slidable, annular force transmitting member 116 drivingly connected to the input member 50, a cam assembly 120, and outer valve member 42 to require a larger torque to rotate the inner valve member 40 relative to the outer valve member 42 making the steering feel more manual.

The force transmitting member or slider 116 (FIG. 1A) is disposed in the power steering control valve housing 44. The force transmitting member 116 rotates about its central axis 46 with the inner valve member 40 and the valve stem 50 and is movable axially along the valve stem 50.

The force transmitting member 116 is connected with the outer valve member 42 by a cam assembly 120. The cam assembly 120 includes a plurality of downwardly facing (as viewed in FIG. 1A) cam surfaces 122 on the force transmitting member 116, a plurality of upwardly facing (as viewed in FIG. 1A) cam surfaces 124 on the outer valve member 42, and a plurality of balls or spherical cam elements 126 located between the cam surfaces 122 and 124, preferably four of each. However, a greater or lesser number of cam elements 126 and cam surfaces 122 and 124 could be used if desired.

The force transmitting member 116 is urged axially toward the outer valve member 42 by a spring 130 acting between a collar 232 connected to the valve stem 50 and the slidable force transmitting member 116. The force applied against the force transmitting member 116 by the spring 130 urges the cam surfaces 122 and 124 against opposite sides of the balls 126 and maintains and centers the balls on the cam surfaces 122 and 124.

Annular upper surface 142 and annular lower surface 144 of the force transmitting member 116 cooperate with a cylindrical inner side surface 134 of the housing 44 and the cylindrical outer surface 135 of the valve stem 50 to partially define a chamber 98 and an annular pressure chamber 136 on axially opposite sides of the force transmitting member 116. A pair of diametrically opposite openings 94 in the inner valve member 40 extend radially inward to an axially extending central passage in the inner valve member 40 which is used to conduct hydraulic fluid to the chamber 136 through opening 138 extending radially outwardly from the axially extending central passage.

The pressure chamber 136 is connected to the reservoir 32 by the return conduits 36 and 34 and the speed responsive control unit 38. From the pressure chamber 136 the fluid is conducted to the speed responsive control unit 38 by the return conduit 36 and from the speed responsive control unit 38 to the reservoir 32 by the return conduit 34.

The force transmitting member 116 has a generally fluid tight fit with the inner side surface 134 of the housing 44. The chamber 98 is connected in fluid communication with the reservoir 32 by return conduit 34. Any fluid which leaks from the pressure chamber 136 into the chamber 98 is thus conducted back to the reservoir 32.

Although the preferred embodiment of the present invention is shown with the spring 130 located in chamber 136, the spring 130 may not be needed. If there is no spring, a torsion bar interconnecting the linear and outer valve members 40 and 42, as is well known in the art is needed and the length of the steering control valve housing 44 can be reduced by reducing the axial length of the chamber 136.

Rotation of the valve stem 50 and inner valve member 40 relative to the housing 44 and outer valve member 42 is resisted by a force which is related to the axial force on the force transmitting member 116 by spring 130 and the fluid pressure force applied against the annular surface 142.

The balls 126 act as driving connections between the force transmitting member 116 and the outer valve member 42. Upon rotation of the inner valve member 40, the cam surfaces 122 and 124 in the force transmitting member 116 and outer valve member 42 create axial and tangential forces on the balls 126 with respect to the force transmitting member 116 and the outer valve member 42. These forces translate into (a) additional torque in the steering column felt by the operator of the vehicle, and (b) resistance to relative rotation of the inner and outer valve members 40 and 42.

Relative rotation between the inner valve member 40 and the outer valve member 42 causes the spherical elements 126 to tend to roll on the cam surfaces 122 and 124 and therefore to move the force transmitting member 116 axially away from an end 146 of the outer valve member 42. Obviously, the force required to move the force transmitting member 116 axially away from the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 and inner valve member 40 relative to the outer valve member 42.

The speed responsive control unit 38 (FIG. 1B) responds to steering activity and vehicle speed to control the fluid pressure in the chamber 136. The speed responsive control unit 38 is connected in fluid communication with the chamber 136 in the housing 44 by the return conduit 36.

The speed responsive control unit 38 includes a housing 180 which is connected hydraulically in series between the return conduit 36 and the return conduit 34. First and second control valves 182 and 184 in the housing 180 regulate the fluid pressure in the chamber 136 of the steering control valve 22. The valve 182 conducts fluid from the chamber 136 to the return conduit 34 and reservoir 32. The valve 184 is responsive to an electrical signal from an electronic control unit (ECU) which is indicative of the speed of the vehicle as measured by a speed sensor (SS). The valve 184 controls the valve 182.

The housing 180 has an inlet 186 in fluid communication with the valve 182 and the chamber 136 through return conduit 36. The housing 180 includes an outlet 188 in fluid communication with chamber 98, valve 182 and return conduit 34. Fluid from the chamber 136 flows through the return conduit 36 to the valve housing 180 and from the housing 180 to the return conduit 34 and to the reservoir 32.

The valve 182 includes a valve body 194 and a valve seat 196. When the valve body 194 is open, spaced from the seat 196, the valve body and seat define an orifice 198. The valve body 194 includes a main body portion 202, an insert 204 in the valve body, and a pin 206 fixedly connected to the valve body. The pin 206 is received in a bore 210 in the housing 180 and is exposed to fluid pressure in a passageway 212. The pressure in the passageway 212 urges the pin 206 and therefore, the valve body 194 toward the valve seat 196. An annular end of a plug 216 in the housing 180 defines the valve seat 196. The plug 216 includes an axially extending passage 218 for conducting fluid from the inlet 186 to the orifice 198.

A spring 220, schematically illustrated in FIG. 1B, located in a bore 222 in the main body portion 202 of the valve body 194 urges a ball 224 against the insert 204 to block an axial bore 225 in the insert. The spring 220 has an end engaging the pin 206 and the other end engaging the ball 224. The insert 204, ball 224, and spring 220 act as a relief valve to limit the maximum pressure in the chamber 136. The main body portion 202 of the valve body 194 has radially extending openings 226 for conducting fluid from the bore 222 to the outlet 188 and to reservoir 32.

The valve 184 is a solenoid operated valve and comprises a spring 236 which urges a spool 238 downward as viewed in FIG. 1B. A plug 239 is threadably received in the housing 180 and has an end engaging the spring 236. The axial position of the plug 239 is adjusted to vary the load that the spring 236 applies to the spool 238.

Figure 2:
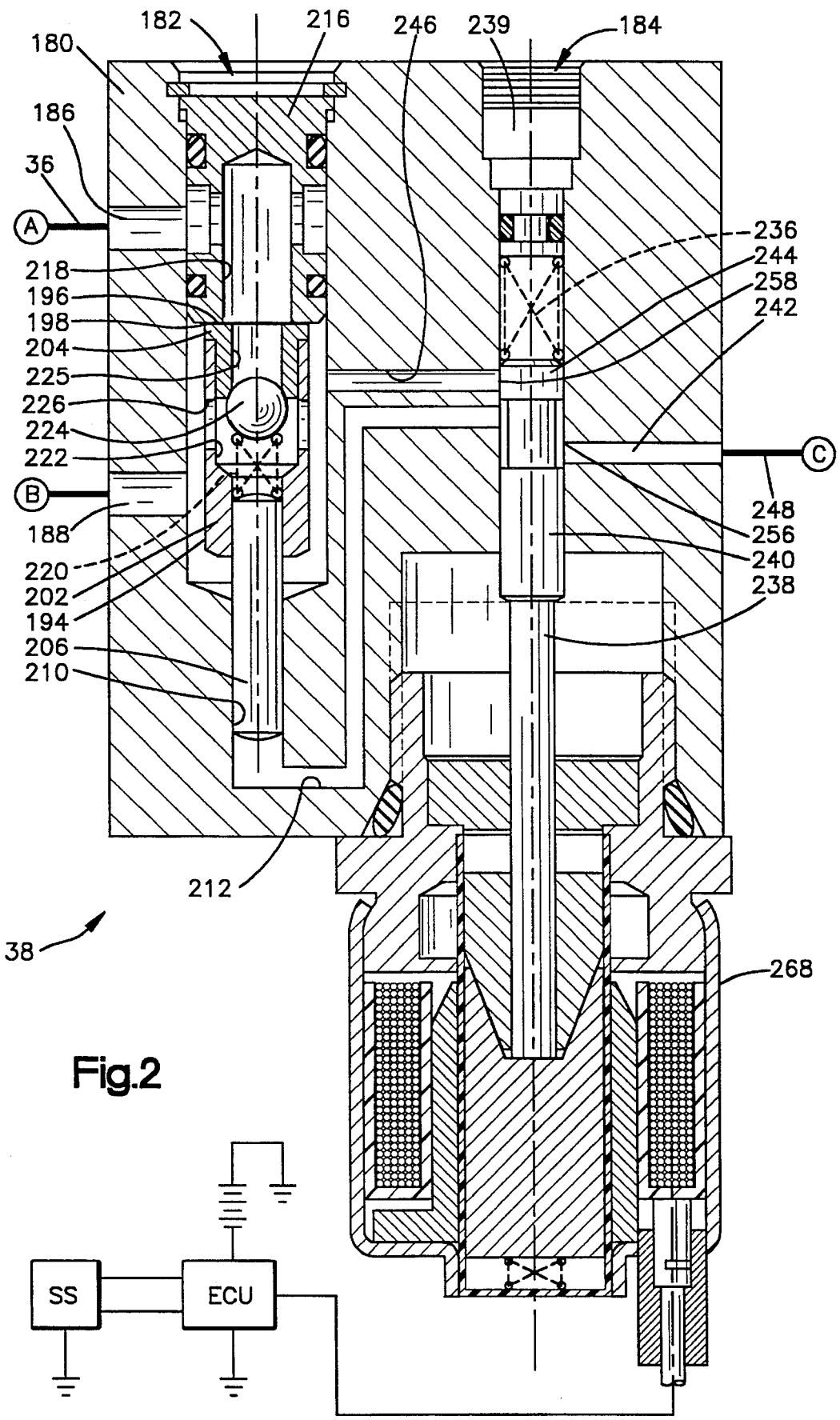
FIG. 2 is an enlarged portion of the speed responsive control unit of FIG. 1B showing positions of valves of the speed responsive control unit.

The spool 238 has a first land 240 for controlling the flow of fluid from a passageway 242 in the housing 180 to the passageway 212. The spool 238 has a second land 244 for controlling the flow of fluid from the passageway 212 to a passageway 246 in the housing 180. A conduit 248 conducts fluid pressure generated by the pump 24, in response to steering demand, from the pump to the passageway 242 and to an orifice 256 (FIG. 2) defined by the land 240 and passageway 242. The passageway 246 conducts fluid from an orifice 258 (FIG. 1B) defined by the land 244 and passageway 246, around the valve 182 and to the outlet 188 and reservoir 32. The orifice 256 controls the flow of fluid from the pump 24 to the passageway 212. The orifice 258 controls the flow of fluid from the passageway 212 to reservoir 32. Therefore, the orifices 256 and 258 control the pressure in passageway 212 and therefore, the pressure applied to the valve body 194 and the size of orifice 198.

A solenoid 268 of the valve 184 controls the position of the spool 238 as a function of vehicle speed. An electronic control unit, ECU, can be programmed to provide a signal to solenoid 268 which positions the spool 238 as a function of vehicle speed. At engine idle and lower vehicle speeds, for example, less than 15 mph, solenoid 268 is energized to move the spool 238 against the bias of the spring 236 and fully open orifice 258 and close orifice 256, as seen in FIG. 1B. Therefore, passageway 212 is open to reservoir 32 and a small pressure is exerted on the valve body 194. At relatively high vehicle speeds, for example, above 35 mph, the solenoid 268 is deenergized allowing the spring 236 to urge the spool 238 downward, as viewed in FIG. 2, and open orifice 256 while closing or restricting orifice 258. At intermediate vehicle speeds, for example, between 15 mph and 35 mph, the solenoid 268 controls the size of the orifices 256 and 258. The solenoid 268 controls the size of the orifice 256 from a smaller size orifice 256 at vehicle speeds near 15 mph to a larger size orifice 256 at vehicle speeds near 35 mph and controls the size of the orifice 258 from a larger size orifice 258 at vehicle speeds near 15 mph to a smaller size orifice 258 at vehicle speeds near 35 mph to modulate the pressure in passageway 212.

At engine idle and relatively low vehicle speeds (FIG. 1B), the solenoid 268 is energized to vent the passageway 212 to reservoir, and the pressure in passageway 212 is relatively low. The orifice 198 is open and allows fluid from the chamber 136 to flow freely to the reservoir 32. A relatively low fluid pressure is present in the return conduit 36 and in the chamber 136. At engine idle and low vehicle speeds, the force of the spring 130 and the low fluid pressure in chamber 136 urge the force transmitting member 116 toward the cam elements 126.

Upon rotation of the steering wheel 18 and valve stem 50 at engine idle and relatively low vehicle speeds, the pressure in conduit 248 increases. The orifice 256 is closed and the fluid pressure in conduit 248 cannot act against the valve body 194 to close or restrict the orifice 198 and the low pressure in chamber 136 is maintained. When there is steering activity, a torque is created between the valve stem 50 and the outer valve member 42, the cam elements 126 exert a force on the force transmitting member 116. The resultant force tends to move the force transmitting member 116 axially away from the outer valve member 42 against the force of the spring 130 and the low pressure in chamber 136. As this occurs, the spring 130 is compressed against the collar 232 of the valve stem 50.

At relatively high speeds of the vehicle (FIG. 2), the solenoid 268 is deenergized and the orifice 256 is open while the orifice 258 is closed or restricted. During a steering maneuver at relatively high speeds, the pump 24 conducts fluid through conduit 248 and to passageway 212 to apply fluid pressure against the valve body 194 and close or restrict the orifice 198. Thus, the pressure in chamber 136 is at a maximum and there is maximum resistance to relative rotation between the inner valve member 40 and the outer valve member 42 and less hydraulic assist is provided and the steering feels more manual.

The maximum pressure in chamber 136 is limited by the spring 220 and ball 224 acting as a relief valve. Pressure in chamber 136 can overcome the bias of the spring 220 and push the ball 224 away from the valve insert 204 to limit the pressure in the chamber 136. Thus, by changing the biasing force of the spring 220, the maximum pressure in the chamber 136 can be changed and therefore, the resistance to relative rotation between the inner and outer valve members 40 and 42 can be tailored to specific requirements.

At high vehicle speeds and no steering, the pump 24 conducts low pressure fluid to the passageway 212. A low pressure is applied to the valve body 194 and orifice 198 is open. The fluid pressure in chamber 136 is low and there is a relatively free flow of fluid from the pump 24, through the control valve 22, and to reservoir 32.

It should be apparent to those skilled in the art that certain modifications, changes and adaptations may be made in the present invention and that it is intended to cover such modifications, changes and adaptations coming within the scope of appended claims.

Having described the invention, the following is claimed:

1. An apparatus comprising:

first and second valve members movable relative to each other to port fluid to a vehicle power steering motor;

a force transmitting member connected with said first valve member and movable toward and away from said second valve member for applying a force to resist relative movement between said first and second valve members;

means defining a fluid pressure chamber for receiving fluid, the pressure of which acts on said force transmitting member;

a valve for controlling the pressure in said fluid pressure chamber, said valve including a pressure chamber for urging said valve toward a closed position; and means for varying the force applied to said valve to urge said valve toward the closed position as a function of the relative positions of said first and second valve members and vehicle speed.

2. An apparatus as set forth in claim 1 wherein said valve conducts fluid from said fluid pressure chamber to reservoir.

3. An apparatus as set forth in claim 1 further including a source of fluid associated with said first and second valve members, a variable orifice for conducting fluid from said source of fluid to said pressure chamber of said valve to urge said valve toward the closed position, and means for varying the size of said variable orifice as a function of vehicle speed.

4. An apparatus as set forth in claim 3 wherein said means for varying the size of said variable orifice increases the size of said variable orifice as vehicle speed increases.

5. An apparatus as set forth in claim 1 further including a first variable orifice for venting said pressure chamber of said valve to prevent said valve from moving toward the closed position, and means for varying the size of said first variable orifice as a function of vehicle speed.

6. An apparatus as set forth in claim 5 further including a source of fluid associated with said first and second valve members, a second variable orifice for conducting fluid from said source of fluid to said pressure chamber of said valve to urge said valve toward the closed position, and means for varying the size of said second variable orifice as a function of vehicle speed.

7. An apparatus as set forth in claim 6 wherein said means for varying the size of said first variable orifice decreases the size of said first variable orifice as vehicle speed increases and said means for varying the size of said second variable orifice increases the size of said second variable orifice as vehicle speed increases.

8. An apparatus as set forth in claim 7 wherein said means for varying the pressure in said pressure chamber of said valve includes a housing, said first variable orifice being defined by a first land on a spool and said housing and said second variable orifice being defined by a second land on said spool and said housing, said spool being moved by a solenoid in response to changes in vehicle speed.

9. An apparatus as set forth in claim 8 wherein said valve for conducting fluid from said fluid pressure chamber includes a seat and a valve body, the pressure in said pressure chamber of said valve urging said valve body toward said seat.

10. An apparatus as set forth in claim 9 wherein said valve body includes a relief valve for limiting the pressure in said fluid pressure chamber.

11. An apparatus comprising:

first and second valve members movable relative to each other to port fluid to a vehicle power steering motor;

a force transmitting member connected with said first valve member and movable toward and away from said second valve member for applying a force to resist movement between said first and second valve members;

means defining a first fluid pressure chamber for receiving fluid, the pressure of which acts on said force transmitting member;

an orifice for controlling the pressure in said first fluid pressure chamber; and means for varying the size of said orifice as a function of the relative positions of said first and second valve members and vehicle speed, including a second fluid pressure chamber and a valve for controlling the pressure in said second fluid pressure chamber.

12. An apparatus as set forth in claim 11 wherein said orifice conducts fluid from said first fluid pressure chamber to reservoir.

13. An apparatus as set forth in claim 11 further including a source of fluid associated with said first and second valve members, said valve conducting fluid from said source of fluid to said second fluid pressure chamber.

14. An apparatus as set forth in claim 13 further including means for controlling the position of said valve as a function of vehicle speed.

15. An apparatus as set forth in claim 11 wherein said valve vents said second fluid pressure chamber to reservoir.

16. An apparatus as set forth in claim 15 further including means for controlling the position of said valve as a function of vehicle speed.

17. An apparatus as set forth in claim 16 further including a source of fluid associated with said first and second valve members, said valve conducting fluid from said source of fluid to said second fluid pressure chamber.

18. An apparatus as set forth in claim 17 wherein said valve includes a spool having first and second lands and a housing, said first land and said housing defining a first variable orifice for conducting fluid from said second fluid pressure chamber to reservoir, said second land defining a second variable orifice for conducting fluid from said source of fluid to said second fluid pressure chamber.

19. An apparatus as set forth in claim 18 wherein said means for controlling the position of said valve includes means for increasing the size of said first variable orifice of said valve as vehicle speed decreases and means for decreasing the size of said second variable orifice of said valve as vehicle speed decreases.

20. An apparatus as set forth in claim 11 wherein said orifice is defined by a valve body and a seat, said means for controlling the size of said orifice includes means for moving said valve body toward said seat as the first and second valve members move relative to each other and vehicle speed increases.

21. An apparatus comprising:

first and second valve members movable relative to each other to port fluid to a vehicle power steering motor;

a force transmitting member connected with said first valve member and movable toward and away from said second valve member for applying a force to resist movement between said first and second valve members;

means defining a first fluid pressure chamber for receiving fluid, the pressure of which acts on said force transmitting member;

an orifice for controlling the pressure in said first fluid pressure chamber; and means for varying the size of said orifice as a function of the relative positions of said first and second valve members and vehicle speed;

said orifice being defined by a valve body and a seat, said means for controlling the size of said orifice including means for moving said valve body toward said seat as the first and second valve members move relative to each other and vehicle speed increases, said valve body including a relief valve for limiting the pressure in said first fluid pressure chamber.

* * * * *